Nov. 15, 1966  S. M. MORENO  3,285,671
BULK MATERIAL TRANSFER APPARATUS
Filed June 26, 1964
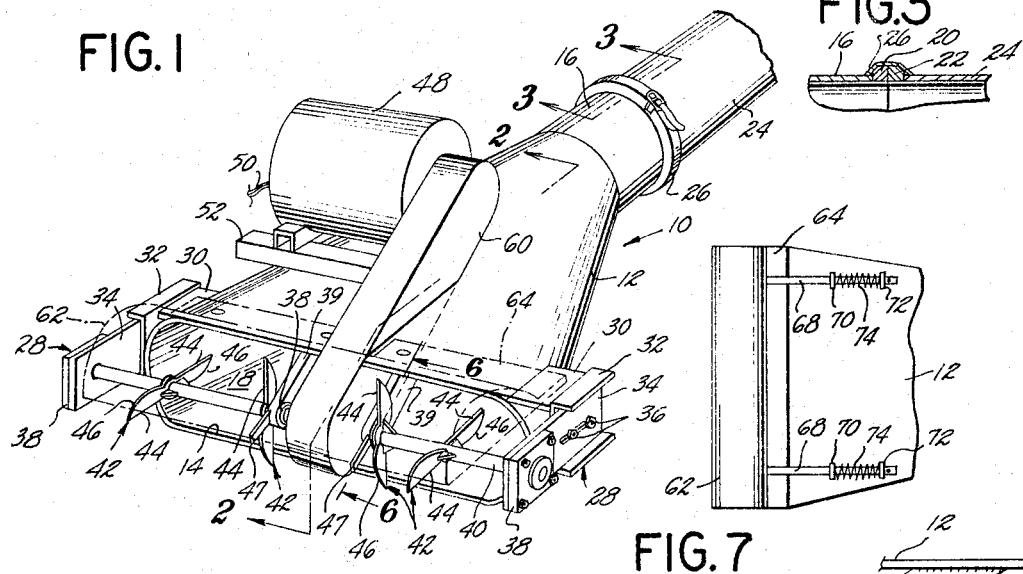
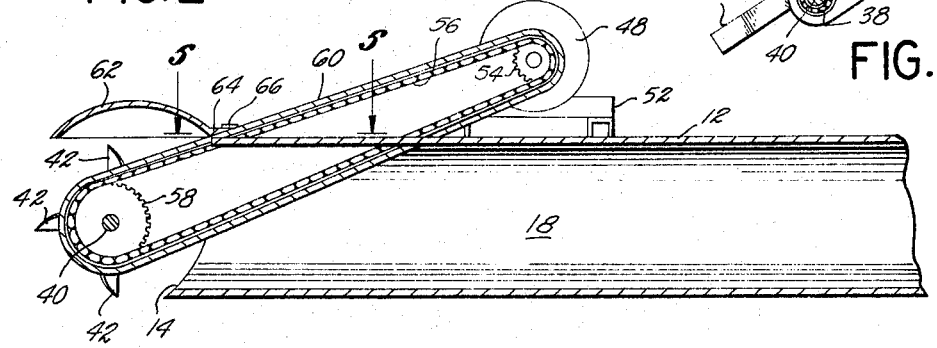
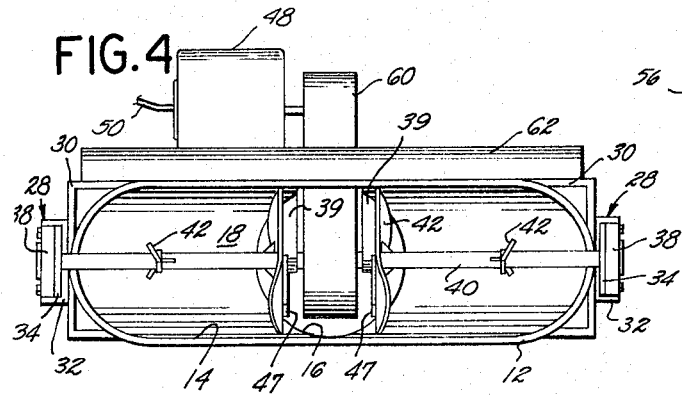
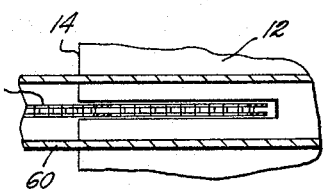
INVENTOR.
SALVADOR M. MORENO
BY *Fulwider, Patton, Rieber,*
*Lee and Utecht*
ATTORNEYS

United States Patent Office 3,285,671
Patented Nov. 15, 1966

3,285,671
BULK MATERIAL TRANSFER APPARATUS
Salvador M. Moreno, 903 Marine Ave.,
Wilmington, Calif.
Filed June 26, 1964, Ser. No. 378,366
2 Claims. (Cl. 302—58)

The present invention relates to bulk material transfer apparatus, and more particularly to apparatus for loading and unloading a conglomerate mass of bulk material such as copra.

It is an object of the present invention to provide a bulk material transfer apparatus having a hollow receiver characterized by an open intake end and an open discharge end adapted for connection to a source of vacuum, and further including a plurality of blades rotatably mounted adjacent the open intake end for chopping into the conglomerate bulk material mass and scattering the resulting shredded material into the receiver for airborne transfer through the discharge end. In this regard, it is a related object of the invention to provide blades each characterized by a sharpened leading edge to better facilitate cutting of a fibrous bulk material such as copra, and further characterized by a pitched trailing edge for thrusting the cut material into the receiver.

Another object of the invention is to provide a bulk material transfer apparatus of the aforementioned character in which the blades are mounted upon a blade shaft extending across the open intake end of the receiver and wherein the shaft is coupled at its center portion to a drive motor so that the coupling belt or chain drive is centrally disposed and in non-interfering relation with respect to the sides of constricting passages, for example. This arrangement permits the present apparatus to be used in relatively confined areas, the central drive arrangement desirably reducing the bulk of the apparatus.

Another object of the invention is to provide an apparatus of the aforementioned character in which the blade shaft is mounted to the receiver in a manner enabling adjustable projection of the shaft forwardly of the receiver to thereby effect proper adjustment of the drive coupling between the blade shaft and the drive motor.

A further object of the present invention is to provide an apparatus of the aforementioned character wherein the blade shaft is mounted to the receiver by means located at opposite ends of the shaft having rotatable bearing elements for rotatably mounting the shaft in a manner characterized by relatively low friction.

A further object of the invention is the provision of an apparatus of the aforementioned character in which at least one of the blades is mounted on a shaft with its leading edge offset approximately 90° relative to the leading edge of an adjacent one of the blades so that the adjacent blades engage the bulk material successively. A related object of the invention is to provide a plurality of blades wherein each of the blades includes a pair of oppositely radiating leading edges, the upper one of the edges being forwardly oriented and the lower one of the edges being rearwardly oriented when the blade is vertically disposed so that the chopping and scattering action is down and under, with the material being conveyed into the receiver from beneath the blade shaft.

A further object of the invention is to provide an apparatus of the aforementioned character which is characterized by a receiver having rearwardly converging walls whereby the suspended or airborne chopped portions of the bulk material are carried rearwardly toward the discharge end of the receiver in an air stream which exerts a progressively greater suspension effect upon the material as it nears the discharge end.

Yet another object of the invention is to provide a bulk material transfer apparatus which is relatively inexpensive to manufacture, comparatively simple to operate, and characterized by an extended service life.

Other objects and features of the invention will become apparent from consideration of the following description taken in connection with the accompanying drawings, in which:

FIG. 1 is a perspective view of a bulk material transfer apparatus according to the present invention, the blade cover being shown in dash-dot outline for clarity;

FIG. 2 is a view taken along the line 2—2 of FIG. 1, the chain guard being removed for clarity;

FIG. 3 is a detail view taken along the line 3—3 of FIG. 1;

FIG. 4 is a front elevational view of the apparatus of FIG. 1;

FIG. 5 is a detail view taken along the line 5—5 of FIG. 2;

FIG. 6 is a detail view taken along the line 6—6 of FIG. 1; and

FIG. 7 is a partial top plan view of an alternative mounting arrangement for the blade safety cover.

Referring now to the drawings, there is illustrated a bulk material transfer apparatus 10 for loading and unloading bulk material such as copra. Copra, for example, stored aboard ship is a conglomerate fibrous mass difficult to unload by conventional means. As will be seen, the apparatus 10 is adapted to chop into the mass and scatter it rearwardly into a confined area from which the copra is removed in a continuous manner by a relatively rapidly flowing stream of air.

The apparatus 10 comprises a hollow receiver 12 having a transversely elongated, open intake end 14 and rearwardly converging walls terminating in a circular discharge end 16. There is thus defined an internal receiver chamber 18 having generally flat upper and lower walls and converging side walls so that the chamber 18 is characterized by a transverse cross-sectional area which progressively diminishes from the intake end 14 to the discharge end 16.

The discharge end 16 includes a circumferential shoulder 20 which is adapted to abut a complemental circumferential shoulder 22 provided upon the end of a vacuum conduit 24, the shoulders 20 and 22 being urged together in fluid-tight relationship by an encircling clamping band 26. The vacuum conduit 24 is connected to a suitable source of vacuum (not shown) whereby a flow of air is induced in the receiver chamber 18. As will be seen, the flow of air is sufficiently rapid to suspend particles or portions of chopped copra for conveyance through the conduit 24 to the unloading point.

A pair of blade mounts 28 are located at opposite extremities of the elongated intake end 14 and each includes a channel 30 having the legs thereof inwardly oriented and welded or otherwise secured to the adjacent walls of the receiver 12, each mount 28 also including a channel 32 having the legs thereof outwardly oriented and mounting a pair of threaded studs at the midportion thereof. In addition, each mount 28 includes an elongated, vertically oriented plate 34 having an elongated slot through which the threaded studs of the channel 32 project, a pair of nuts 36 being mounted upon the studs to adjustably secure the plate 34 in position. As will be apparent, the nuts may be loosened to adjust the forward projection of the forward extremity of the plate 34, and the nuts tightened to secure the plate 34 in its adjusted position.

Each plate 34 includes a bearing 38 secured to its forward extremity and including rotatable elements such as ball bearings so that the pair of bearings 38 rotatably support the opposite ends of the blade shaft 40. In addition, as best viewed in FIGS. 1 and 6, a pair of forwardly and downwardly projecting bearing support arms 39 are secured to the receiver 12 at their inner ends, and at their outer ends mount a pair of the bearings 38 which rotatably support the control portion of the blade shaft 40.

The blade shaft 40 extends across the intake end 14 and mounts a plurality of blades 42 for rotation therewith, each blade 42 including a pair of oppositely radiating leading edges 44 and trailing edges 46 which are pitched at approximately 10° relative to the leading edge. The upper one of the leading edges 44 of each blade 42 is forwardly oriented, and the lower one of the edges 44 is rearwardly oriented, when the blade 42 is vertically disposed, so that the blades 42 are adapted to engage bulk material located forwardly of the apparatus 10 for chopping and scattering the material in a path which passes beneath the blade shaft 40 and into the interior of the receiver 12. In addition, the outer pair of blades 42 are fixed to the shaft 40 in offset relation with respect to the inner pair of blades 42, that is, rotated approximately 90° relative thereto. This provides a more continuous cutting and thrusting action as the blades successively engage the material at quarter revolution intervals, as compared to the half-revolution intervals of engagement if all of the blades 42 were similarly oriented.

The leading edges 44 are preferably sharpened to facilitate cutting of the conglomerate mass to break it up for scattering by the pitched trailing edges 46. To facilitate such cutting, a pair of elongated fixed blades 47 are secured, respectively, to the bearing support arms 39 and constitute shearing edges across which the inner pair of blades 42 travel to shear the copra. If desired, similar blades 47, with suitable supporting arms, also could be provided for the outer blades 42 if desired, but the arrangement illustrated has operated quite satisfactorily.

An electric drive motor 48 having a cord 50 for connection to a suitable source of power (not shown) is secured to a motor platform 52 which is welded or otherwise affixed to the upper side of the receiver 12. As best viewed in FIG. 2, the drive shaft of the motor 48 mounts a drive sprocket 54 which is coupled by a drive chain 56 to a reel sprocket 58 mounted to the central portion of the blade shaft 40, between the pair of inner bearings 38, and rotatable therewith. The slack in the drive chain 56 is taken up by loosening the nuts 36 and moving the plates 34 to adjust the forward projection of the blade shaft 40, and consequently the forward position of the reel sprocket 58.

An elongated chain guard 60 configured to enclose the drive chain 56 and the sprockets 54 and 58 is rigidly mounted to the upper wall of the receiver 12, the wall being suitably slotted or cut away to accommodate the drive chain 56 and the protective chain guard 60. In addition, a transversely elongated safety cover 62, generally arcuate in transverse cross-section with closed ends is supported above the blades 42 in overlying, cantilever fashion by a rearwardly extending flange 64 integral with the cover 62, the flange 64 being secured to the receiver 12 by a plurality of transversely spaced bolts 66 disposed through suitable openings in the receiver wall and secured in position by nuts or the like (not shown). The bolts 66 are easily removable to facilitate access to the blades 42 and blade shaft 40 for maintenance and replacement purposes.

As best viewed in FIG. 7, an alternative mounting arrangement can be provided for the safety cover 62 to permit retraction thereof upon engagement of the copra or other bulk material. More particularly, a pair of rods 68 are welded at their forward ends to the cover 62, and each fixedly mounts a circumferential shoulder or stop 70. The inner end of each rod 68 is axially slidable through an opening provided in a bracket 72 secured to the receiver 12. In addition, a compression spring 74 is mounted upon each rod 68 with its opposite ends in engagement with the associated stop 70 and bracket 72 to bias the cover 62 to the position illustrated in FIG. 2 for the protection of workmen. However, when the apparatus is forced into a mass of copra, the cover 62 is slid back over the top wall of the receiver 12 into a retracted position in which the blades 42 can reach copra located above them.

In one embodiment of the present invention, the overall length of each blade 42 was made approximately 9½ inches and the blade shaft 40 rotated at approximately 200 revolutions per minute. This was found to provide sufficient cutting and thrusting action to chop and scatter the bulk material, in this case copra, into the receiver 12 for airborne transfer through the discharge end 16 to the point of unloading.

From the foregoing, it is seen that a bulk material apparatus has been provided which is adapted to quickly and easily unload a bulk material cargo such as copra from ships in an automatic and continuous manner.

Various modifications and changes may be made with regard to the foregoing detailed description without departing from the spirit of the invention or the scope of the following claims.

I claim:
1. Bulk material transfer apparatus comprising:
   receiver means adapted to receive chopped bulk material and operative to transfer said material to an unloading point;
   blade mounting means secured to said receiver means and including a rotatable blade shaft;
   a plurality of cutting blades mounted to said shaft in radially extending relation for rotation therewith, each said blade including a sharpened leading edge and a trailing edge which is pitched relative to said leading edge;
   a plurality of shear blades mounted to said receiver means and located adjacent the paths of rotation of the leading edges of said cutting blades, respectively, whereby the bulk material is sheared therebetween upon rotation of said cutting blades relative to said shear blades;
   and drive means coupled to said shaft and operative to rotate said shaft and said cutting blades whereby bulk material is cut by said leading edges and scattered toward said receiver means by said trailing edges for transfer to said unloading point.

2. Bulk material transfer apparatus according to claim 1 wherein said receiver means includes an open intake end and an open discharge end adapted for connection to a source of vacuum, and said shaft extends across said intake end.

References Cited by the Examiner

UNITED STATES PATENTS

| | | | |
|---|---|---|---|
| 1,550,311 | 8/1925 | Foster | 214—17.84 |
| 2,446,573 | 8/1948 | Cameron | 302—58 |
| 2,717,812 | 9/1955 | Eglities | 214—17.84 |
| 2,862,536 | 12/1958 | Gronberg | 146—117 |
| 2,905,506 | 9/1959 | Kristensen | 302—58 |
| 3,027,925 | 4/1962 | Gronberg | 146—117 |
| 3,115,715 | 12/1963 | Baldwin | 198—213 |
| 3,180,315 | 4/1965 | Moloney | 198—213 |

ANDRES H. NIELSEN, *Primary Examiner.*
EVON C. BLUNK, *Examiner.*